(12) United States Patent
Unbehaun et al.

(10) Patent No.: US 7,503,544 B2
(45) Date of Patent: Mar. 17, 2009

(54) FLAP VALVE FOR A MOTOR VEHICLE EXHAUST SYSTEM

(75) Inventors: Martin Unbehaun, Nürnberg (DE); Yohann Rouaud, St. Mars du Desert (FR); Matthias Hildebrand, Bislohe (DE)

(73) Assignee: Faurecia Abgastechnic GmbH, Fuerth (DE)

( * ) Notice: Subject to any disclaimer, the term of this patent is extended or adjusted under 35 U.S.C. 154(b) by 0 days.

(21) Appl. No.: 11/650,804

(22) Filed: Jan. 8, 2007

(65) Prior Publication Data
US 2007/0131889 A1    Jun. 14, 2007

Related U.S. Application Data

(63) Continuation of application No. PCT/EP2005/007332, filed on Jul. 7, 2005.

(30) Foreign Application Priority Data
Jul. 7, 2004    (DE) ............... 10 2004 032 856

(51) Int. Cl.
*F16K 1/22* (2006.01)
(52) U.S. Cl. ............. 251/308; 251/214; 251/305
(58) Field of Classification Search ........ 251/305, 251/306, 307, 308, 214; 123/337
See application file for complete search history.

(56) References Cited

U.S. PATENT DOCUMENTS

| | | | | |
|---|---|---|---|---|
| 3,076,657 A | | 2/1963 | Kulik | |
| 3,661,171 A | * | 5/1972 | Smith et al. | 137/375 |
| 3,902,697 A | * | 9/1975 | Robinson | 251/306 |
| 4,079,747 A | * | 3/1978 | Roberts | 137/375 |
| 5,203,539 A | * | 4/1993 | Stary | 251/308 |
| 5,350,154 A | | 9/1994 | Takama et al. | |
| 5,630,571 A | | 5/1997 | Kipp et al. | |
| 5,711,510 A | * | 1/1998 | Stary | 251/214 |
| 6,273,119 B1 | * | 8/2001 | Foster et al. | 137/15.25 |
| 6,598,854 B1 | | 7/2003 | Jessberger et al. | |

FOREIGN PATENT DOCUMENTS

| | | |
|---|---|---|
| CH | 207 290 | 10/1939 |
| DE | 43 37 097 C2 | 5/1997 |
| DE | 198 48 440 A1 | 4/2000 |
| DE | 100 06 795 A1 | 2/2001 |
| DE | 697 09 521 T2 | 8/2002 |
| DE | 699 02 429 T2 | 8/2006 |
| EP | 0 023 953 A1 | 2/1981 |
| EP | 0 821 148 A1 | 1/1998 |
| EP | 0 821 191 A1 | 1/1998 |
| EP | 0 835 998 A1 | 4/1999 |
| EP | 1 291 509 A2 | 3/2003 |

* cited by examiner

*Primary Examiner*—John K Fristoe, Jr.
(74) *Attorney, Agent, or Firm*—Laurence A. Greenberg; Werner H. Stemer; Ralph E. Locher

(57) ABSTRACT

A flap valve for a motor vehicle exhaust system includes a valve housing in which a valve flap is pivotally mounted about a shaft. A bearing housing is disposed in a gas-tight manner outside the valve housing. The shaft is extended through a first orifice in the valve housing and emerges from the bearing housing through a second orifice. Inside the bearing housing, the shaft is surrounded by a bearing ring having a supporting surface pointing towards the valve flap. A spring element, which is mounted in the bearing housing, surrounds the shaft and is supported at the supporting surface and directly or indirectly at the shaft.

11 Claims, 2 Drawing Sheets

FLAP VALVE FOR A MOTOR VEHICLE EXHAUST SYSTEM

CROSS-REFERENCE TO RELATED APPLICATIONS

This is a continuing application, under 35 U.S.C. § 120, of copending International Application No. PCT/EP2005/007332, filed Jul. 7, 2005, which designated the United States; this application also claims the priority, under 35 U.S.C. § 119, of German Patent Application DE 10 2004 032 856.0, filed Jul. 7, 2004; the prior applications are herewith incorporated by reference in their entirety.

BACKGROUND OF THE INVENTION

Field of the Invention

The invention relates to a flap valve for a motor vehicle exhaust system.

Such a valve which is known, for example, from European Patent EP 0 835 998 B1, is used generally as a shut-off member in branched exhaust systems. It has a valve housing in which a flap is mounted rotatably about a shaft running transversely relative to a central longitudinal axis of the valve housing or transversely relative to a flow duct delimited by the latter. That valve flap is pivotable between a closing position covering the inner cross-sectional area of the valve housing and an opening position uncovering or releasing the inner cross-sectional area. A bearing housing is mounted, for example welded, gas-tightly, on the outside of the valve housing. The shaft projects through a first orifice in the valve housing into the bearing housing and projects through a second orifice in the bearing housing out of the latter again. Within the bearing housing, the shaft is surrounded by a bearing ring which has a spring-loaded supporting surface pointing toward the flap and oriented transversely with respect to the shaft and a sliding surface pointing away from the flap and cooperating with an inner wall region of the bearing housing to provide a slide pairing. The inner wall region delimits the second orifice. The sliding surface is pressed against the inner wall region by a spring element which surrounds the shaft and which is supported, on one hand, on the supporting surface and, on the other hand, indirectly or directly on the shaft. In such a flap valve, the material of the bearing ring is selected in such a way that, when the shaft is actuated rotationally, frictional forces as low as possible have to be overcome, but sufficient sealing off is nevertheless ensured. In other words, a situation is prevented in which exhaust gas may pass outward through a separating gap between the bearing ring and the inner wall region of the bearing housing. Materials which fulfill those requirements, for example ceramic materials, have, as a rule, a lower thermal expansion than the material of the shaft, for example stainless steel. During operation, temperatures of 600° C. and above are reached in the bearing housing. In order to allow a radial expansion of the shaft in the event of such heating, without the bearing ring being destroyed in that case, a correspondingly large play must be provided between those parts. As a result of that play, however, exhaust gases may pass outward between the shaft and the bearing ring. In the flap valve known from European Patent EP 0 835 998 B1, such a leakage of exhaust gas is prevented by using a spring washer stack as a spring element. The individual spring washers lie in each case with their inner and outer edges one on the other in a more or less gastight manner and thus form a cylinder with a closed cylinder wall. The two outer spring washers sealingly bear respectively flat against the supporting surface of the bearing ring and against a countersurface on the shaft. That region of the shaft which is disposed between the bearing ring and the countersurface is thus sealed off, substantially gas-tightly, so that no exhaust gas can pass outward through the annular gap present between the bearing ring and shaft due to the bearing play.

SUMMARY OF THE INVENTION

It is accordingly an object of the invention to provide a flap valve for a motor vehicle exhaust system, which overcomes the hereinafore-mentioned disadvantages of the heretofore-known devices of this general type and which manages without costly spring washers, while an escape of exhaust gas through an annular gap between a bearing ring and a shaft is nevertheless prevented or at least reduced.

With the foregoing and other objects in view there is provided, in accordance with the invention, a flap valve for a motor vehicle exhaust system. The flap valve comprises a valve housing having a central longitudinal axis, an inner cross-sectional area, an outside and a first orifice. A bearing housing which is mounted gas-tightly on the outside of the valve housing has an inner wall region and a second orifice delimited by the inner wall region. A shaft extended transversely relative to the central longitudinal axis of the valve housing projects through the first orifice in the valve housing into the bearing housing and emerges from the bearing housing again through the second orifice in the bearing housing. The shaft has a central longitudinal axis and is formed of a material having a thermal expansion. A valve flap is pivotable in the valve housing about the shaft between a closing position covering the inner cross-sectional area and an opening position uncovering the inner cross-sectional area. A bearing ring surrounding the shaft within the bearing housing has a supporting surface pointing toward the valve flap and oriented transversely relative to the shaft and a sliding surface pointing away from the valve flap and cooperating with the inner wall region of the bearing housing to provide a slide pairing. The bearing ring has at least one region, including the sliding surface, being formed of a material with a lower thermal expansion than the material of the shaft. At least one mineral fiber mat is compressed in direction of the central longitudinal axis of the shaft and is provided as a spring element surrounding the shaft in the bearing housing. The at least one mineral fiber mat is supported on the supporting surface of the bearing ring and indirectly or directly on the shaft.

In accordance with another feature of the invention, the at least one mineral fiber mat is a mat used for mounting monoliths in exhaust systems of motor vehicles. Such mats, particularly when they are mats which are used for the mounting of monoliths in exhaust systems of motor vehicles, generate return forces in the compressed state which equate to those of a helical spring or of a spring washer stack and are sufficient to press the bearing ring against the bearing housing with sufficiently high force and to ensure the required leak-tightness. In the compressed state, the fibers of these mats are pressed together, leak-tightly, in such a way that a passage of exhaust gas can be observed, at most, to an insignificant extent.

In accordance with a further feature of the invention, mats with polycrystalline fibers are preferably used. These mats are resistant to high temperature and can be employed at temperatures of more than 1000° C. Polycrystalline fibers are fibers with an aluminum oxide content of >63% by weight and are produced by the sol-gel method from aqueous spinning solutions. Preferred mats contain 80 to 99% by weight of polycrystalline fibers. In order to make handling and mounting easier, polycrystalline as well as other mineral fiber mats are used which contain an organic binder, preferably a binder on an acrylic base. Such binders, as well as other organic binders which are contained in a fraction of 1 to 20% by weight, burn virtually without any residue, at the prevailing operating temperatures.

In accordance with an added feature of the invention, the material for the bearing ring, which has both good sliding properties and sealing properties in cooperation with a metallic surface, that is to say the above-mentioned inner wall region of the bearing housing, is a ceramic material. This material, of course, has a substantially lower thermal expansion than the metallic shaft which is formed, for example, of stainless steel. A correspondingly large play is therefore required between the shaft and the bearing ring in order to ensure an unimpeded radial expansion of the shaft at high temperatures. The bearing ring may be formed entirely of ceramic material. It is also conceivable, however, that only a region carrying the sliding surface is formed of ceramic.

In accordance with a concomitant feature of the invention, the spring element is supported directly on the shaft. For this purpose, an outwardly extending radial shoulder is present on the latter. Preferably, however, between the spring element and the radial shoulder, there is a bushing which surrounds the shaft and which with its circumferential surface cooperates with the inner surface of the bearing housing providing a slide pairing. Since the bushing is a separate part, it can be manufactured from a material which has lower coefficients of friction, as compared with the metallic bearing housing, than would be the case in a metal-to-metal friction pairing. A bushing formed of ceramic material is preferably employed.

Other features which are considered as characteristic for the invention are set forth in the appended claims.

Although the invention is illustrated and described herein as embodied in a flap valve for a motor vehicle exhaust system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
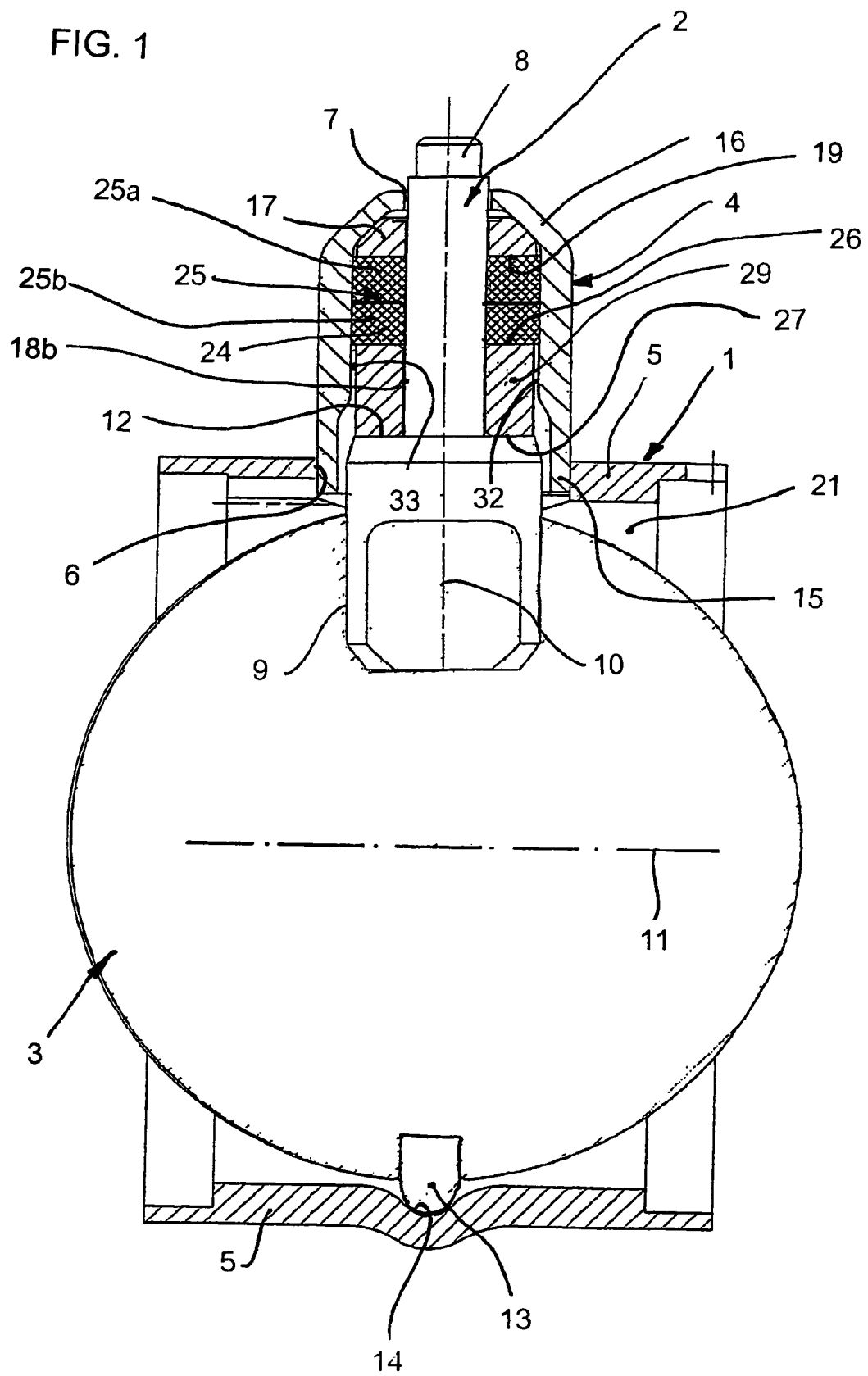
FIG. 1 is a diagrammatic, cross-sectional view of a flap valve.

Referring now to the figures of the drawings in detail and first, particularly, to FIG. 1 thereof, there is seen a flap valve which includes a valve housing 1 constructed as a tubular segment, a valve flap 3 disposed in the latter and mounted rotatably with the aid of a shaft 2, and a bearing housing 4. The shaft 2 extends transversely with respect to a central longitudinal axis 11 of the valve housing 1 or of a flow duct 21 surrounded by the latter. A wall 5 of the valve housing 1, having a circular inner cross section, is pierced by a first orifice 6. The shaft 2 extends through this orifice into the bearing housing 4. An outer end 8 of the shaft, facing away from the valve flap 3, passes through a second orifice 7 which is present in the bearing housing 4. An inner end 9 of the shaft 2 is widened radially, and a transition between narrower and wider shaft parts is constructed as a radial shoulder 12 extending at right angles with respect to a central longitudinal axis 10 of the shaft 2. The inner end 9 of the shaft 2 carries the valve flap 3. For this purpose, the end 9 has a non-illustrated axial slot, in which the valve flap 3 is inserted at an edge region and fixed, for example through the use of a weld. At a location lying diametrically opposite the inner end 9 and pierced by the central longitudinal axis 10, the valve flap 3 has fixed to it a bearing journal 13 which engages in a cup-shaped protuberance 14 in the wall 5 of the valve housing 1.

Figure 2:
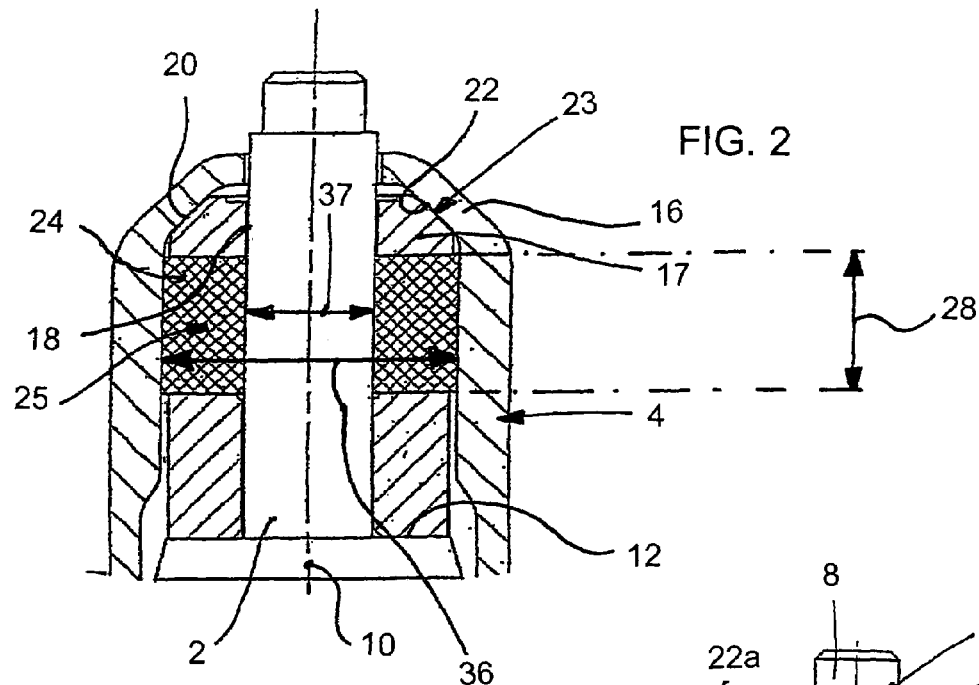
FIG. 2 is a fragmentary, cross-sectional view orthogonal to a portion of FIG. 1.

The approximately sleeve-shaped bearing housing 4 is inserted, with its end 15 facing an inner space of the valve housing 1, into the first orifice 6 of the valve housing and is welded to the wall 5. That region of the bearing housing 4 which, for example, adjoins the second orifice 7, is constructed in the form of a cone 16 opening toward the flap 3. A bearing ring 17, being formed of a ceramic material, is disposed in this region of the bearing housing 4. As is seen in FIG. 2, the bearing ring 17 surrounds the shaft 2 so as to leave an annular gap 18 free. In this case, the annular gap 18 is dimensioned in such a way that, in the event of heating to temperatures of >600° C. while the vehicle is in operation, the shaft can expand radially, without expanding the bearing ring 17 radially in this case, which would result in the destruction of the latter due to the brittle ceramic material. The bearing ring 17 has a planar supporting surface 19 facing the valve flap 3 and running transversely with respect to the central longitudinal axis 10. Furthermore, a sliding surface 20, which is present on the bearing ring 17, points away from the valve flap 3 and cooperates with an inner wall region 22 of the cone 16 or of the bearing housing 4 with the effect of a slide pairing. The sliding surface 20 is curved and is part of a spherical or toroidal surface. By virtue of this configuration, only a narrow, virtually linear contact region 23 is present between the inner wall region 22 and the sliding surface 20.

A mineral fiber mat 25 is disposed in an annular space 24 which is present between the shaft 2 and the inner wall of the bearing housing 4. This mat 25 is a mat having polycrystalline fibers. Such a mat, which is also used for the mounting of monoliths, is obtainable under the trademark MAFTEC® of the company Thermal Ceramics, in the United States. This is a mat with 80 to 99% by weight of polycrystalline fibers which have a fraction of more than 63% by weight of aluminum oxide. The fibers are connected to one another through the use of 1 to 20% by weight of acrylate binder. The mineral fiber mat 25 is disposed in the annular space 24 in such a way that its fibers run substantially transversely with respect to the shaft 2 or with respect to the central longitudinal axis 10 of the latter. In the compressed state, the mineral fiber mat 25 is supported, on one hand, on the supporting surface 19 of the bearing ring 17 and, on the other hand, on an end face 26, facing away from the valve flap 3, of a bushing 29 surrounding the shaft 2. The bushing 29, in turn, bears flat, with its other end face 27, against the radial shoulder 12. In an actual exemplary embodiment, as is indicated in FIG. 2, the annular space 24 has a height 28 of 8 mm, an outside diameter 36 (corresponding to the inside diameter of the bearing housing 4 in the region of the mineral fiber mat 25) of 14 mm and an inside diameter 37 (corresponding to the diameter of the shaft 2) of 6 mm. Two mat rings 25a, 25b punched out of a mat blank and having an initial thickness in each case of 8 to 9 mm and a weight per unit area of 1200 g/m² are pressed into the annular space 24. The outside diameter of the uncompressed mat rings 25a, 25b is 14 mm and their inside diameter is 5.5 mm. By virtue of these dimensions, the mat rings 25a, 25b can be introduced easily into the annular space 24, but fill the latter completely. The initial density of the mat rings 25a, 25b is approximately 160 kg/m³, whereas, after axial compression, the mat has a nominal density of approximately 320 kg/m³. In the compressed state of the mineral fiber mat 25 being formed of two parts, a surface pressure of approximately 12 N/cm² and a spring force of approximately 18N are achieved. This spring force is sufficient to press the bearing ring 17 with its sliding surface 20 against the inner wall region 22 of the bearing housing 4 in such a way that sufficient leak-tightness is ensured. The mineral fiber mat 25 performs its sealing and spring functions even at temperatures of more than 1000° C. Leakages of less than 2 l/min at 300 mbar are achieved in this case.

The bushing 29 likewise surrounds the shaft 2 so as to leave an annular gap 18b free, in order to allow the above-mentioned radial expansion of the shaft 2. The outside diameter of the bushing 29 and the inside diameter of an inner wall region 32 of the bearing housing 4 which surrounds the bushing, are dimensioned in such a way that, even in the cold state, an annular gap 33 is present between those parts. In the event that the bushing 29 comes into contact with the inner wall region in spite of this annular gap, the rotational actuation forces for the shaft 2 are only insignificantly increased due to the low friction between the ceramic material of the bushing 29 and the metallic bearing housing 4.

Figure 3A:
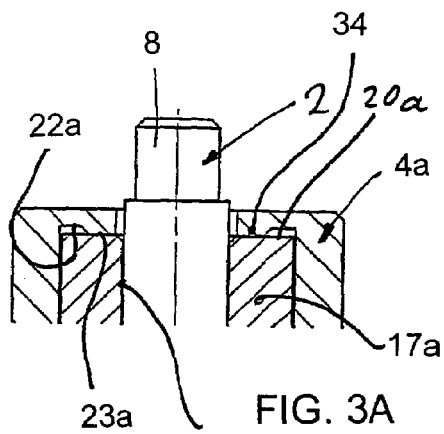
FIGS. 3A to 3C are fragmentary, cross-sectional views, corresponding to a portion of FIG. 2, illustrating different slide pairings between a bearing ring and a bearing housing.
Figure 3B:
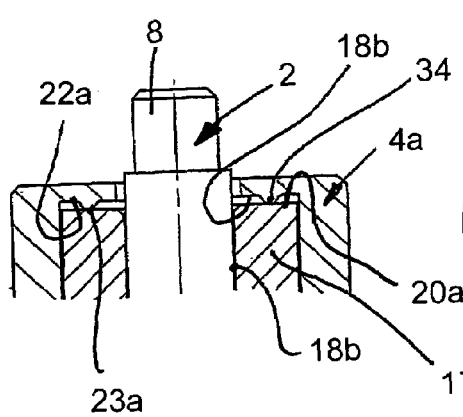
Figure 3C:
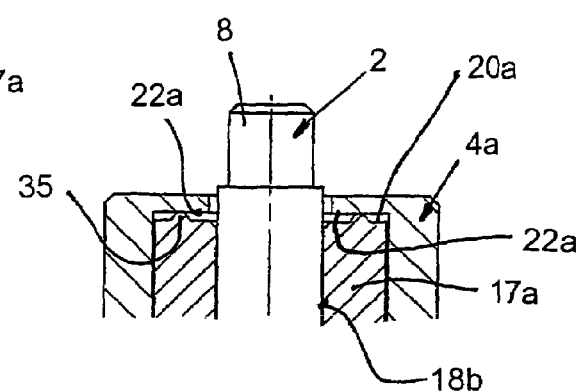

FIGS. 3A to 3C show a bearing housing 4a having an inner wall region 22a which cooperates with a bearing ring 17a and does not extend obliquely, but rather at right angles, with respect to the central longitudinal axis 10 of the shaft 2. A sliding surface 20a of the bearing ring 17a extends parallel to the inner wall region 22a. However, the inner wall region 22a and the sliding surface 20a do not bear one against the other over their entire area, but only over a smaller contact region 23a. This is implemented in such a way that either the sliding surface 20a or the inner wall region 22a has an annular projection 34 (see FIGS. 3A and 3B) or 35 (see FIG. 3C) projecting from it, which cooperates with the other surface in each case, with the effect of a slide pairing. It is noted that the location of the annular projection 34 is different in FIGS. 3A and 3B.

We claim:

1. A flap valve for a motor vehicle exhaust system, the flap valve comprising:
    a valve housing having a central longitudinal axis, an inner cross-sectional area, an outside and a first orifice;
    a bearing housing mounted gas-tightly on said outside of said valve housing, said bearing housing having an inner wall region and a second orifice delimited by said inner wall region;
    a shaft extended transversely relative to said central longitudinal axis of said valve housing, said shaft projecting through said first orifice in said valve housing into said bearing housing and emerging from said bearing housing again through said second orifice in said bearing housing, said shaft having a central longitudinal axis, said shaft having a radial shoulder and said shaft being formed of a material having a thermal expansion;
    a valve flap pivotable in said valve housing about said shaft between a closing position covering said inner cross-sectional area and an opening position uncovering said inner cross-sectional area;
    a bearing ring surrounding said shaft within said bearing housing, said bearing ring having a supporting surface pointing toward said valve flap and oriented transversely relative to said shaft and a sliding surface pointing away from said valve flap and cooperating with said inner wall region of said bearing housing to provide a slide pairing, and said bearing ring having at least one region, including said sliding surface, being formed of a material with a lower thermal expansion than said material of said shaft; and
    at least one mineral fiber mat being compressed in direction of said central longitudinal axis of said shaft and provided as a spring element surrounding said shaft in said bearing housing for exerting a force in the direction of said central longitudinal axis of said shaft, said at least one mineral fiber mat being supported on said supporting surface of said bearing ring and indirectly or directly on said radial shoulder of said shaft, wherein the exerted force acts on said bearing ring to sealingly press said sliding surface of said bearing ring against said inner wall region of said bearing housing.

2. The flap valve according to claim 1, wherein said at least one mineral fiber mat is a mat used for mounting monoliths in exhaust systems of motor vehicles.

3. The flap valve according to claim 1, wherein said at least one mineral fiber mat has poly-crystalline fibers.

4. The flap valve according to claim 3, wherein said at least one mineral fiber mat contains 80 to 99% by weight of poly-crystalline fibers.

5. The flap valve according to claim 1, wherein said at least one mineral fiber mat contains 1 to 20% by weight of organic binder.

6. The flap valve according to claim 5, wherein said organic binder has an acrylic base.

7. The flap valve according to claim 1, wherein said at least one region of said bearing ring, including said sliding surface, is formed of a ceramic material.

8. The flap valve according to claim 1, wherein:
    said bearing housing has an inner surface;
    a bushing surrounds said shaft and has a circumferential surface cooperating with said inner surface of said bearing housing to provide a further slide pairing; and
    said spring element has an end pointing away from said bearing ring and being supported on said radial shoulder with said bushing disposed between said end of said spring element pointing away from said bearing ring and said radial shoulder.

9. The flap valve according to claim 8, wherein said bushing is formed of a ceramic material.

10. The flap valve according to claim 1, wherein said sliding surface of said bearing ring is opposite said supporting surface of said bearing ring.

11. The flap valve according to claim 1, wherein said valve flap has a bearing journal and said valve housing has a cup-shaped protuberance, the exerted force acts on said shoulder to press said bearing journal against said protuberance.

\* \* \* \* \*